C. A. MINER.
DOOR AND WALL PANEL FOR VEHICLE BODIES.
APPLICATION FILED FEB. 27, 1922.
1,420,051.
Patented June 20, 1922.
3 SHEETS—SHEET 1.
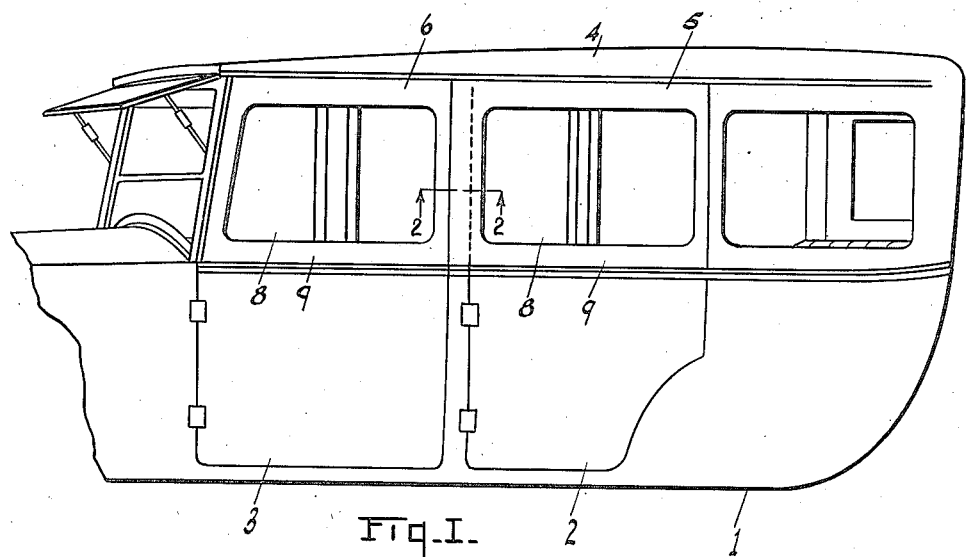
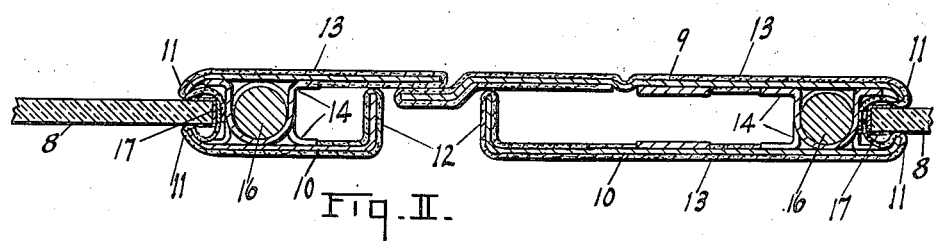
INVENTOR.
Charles A. Miner
BY
ATTORNEYS C. A. MINER.
DOOR AND WALL PANEL FOR VEHICLE BODIES.
APPLICATION FILED FEB. 27. 1922.
1,420,051.
Patented June 20, 1922.
3 SHEETS—SHEET 2.
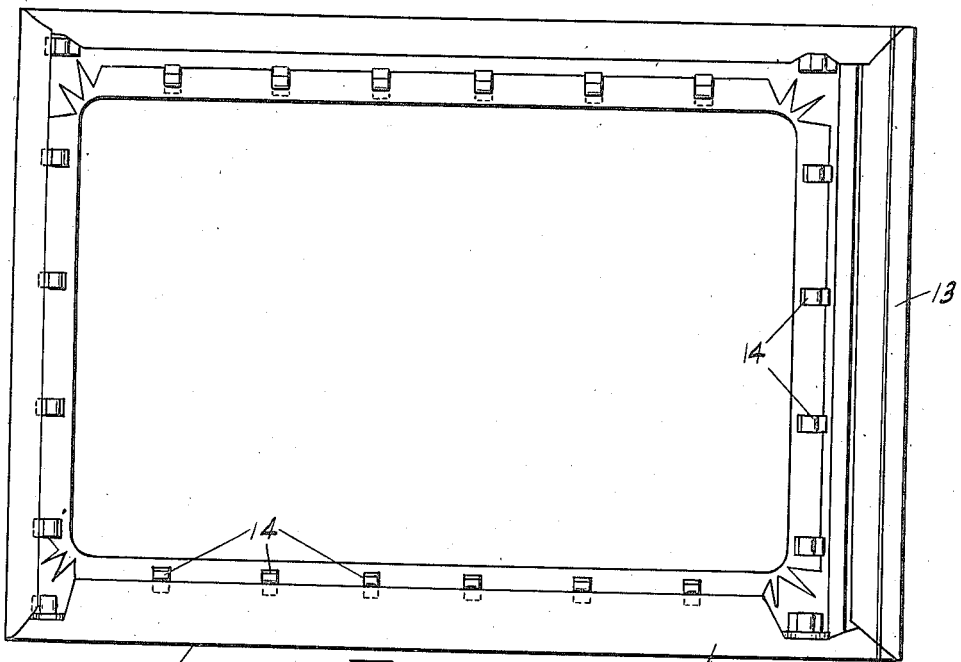
Fig. III.
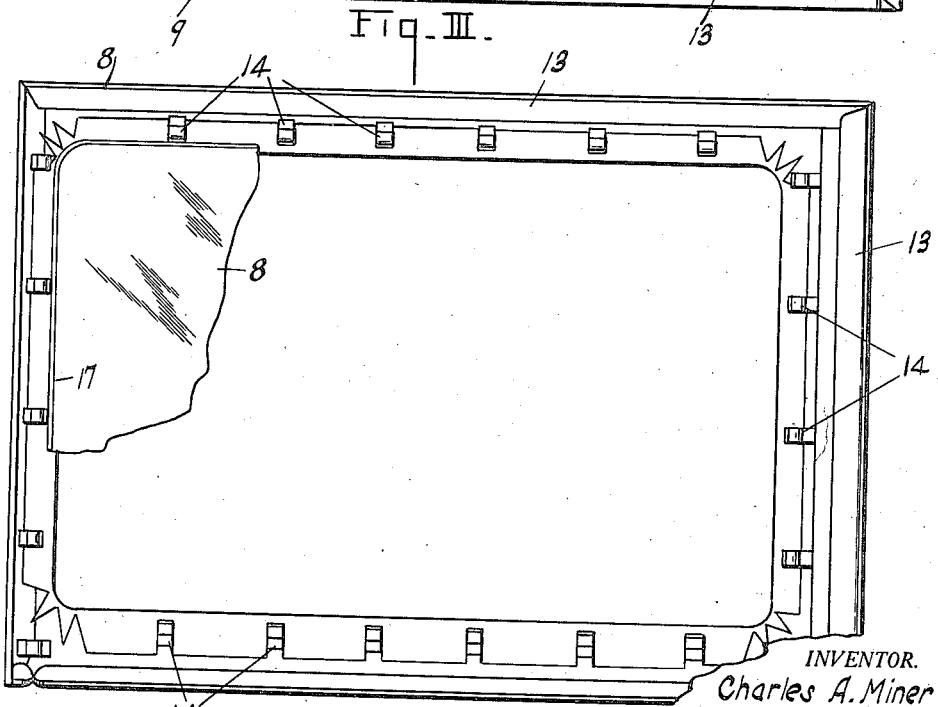
Fig. IV.
INVENTOR.
Charles A. Miner
BY
ATTORNEYS.

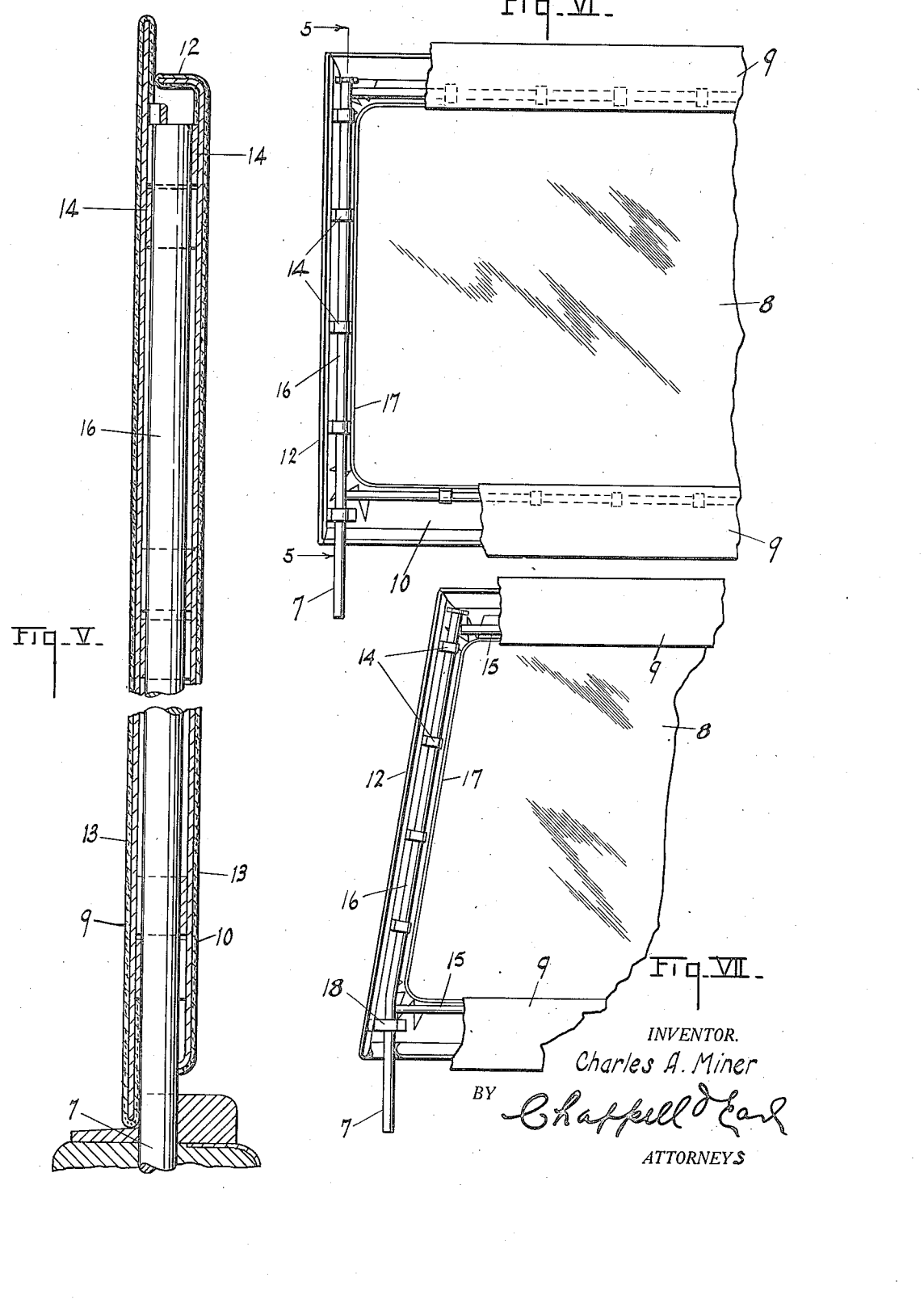

UNITED STATES PATENT OFFICE.

CHARLES A. MINER, OF KALAMAZOO, MICHIGAN, ASSIGNOR TO LIMOUSINE BODY COMPANY, OF KALAMAZOO, MICHIGAN.

DOOR AND WALL PANEL FOR VEHICLE BODIES.

1,420,051.  Specification of Letters Patent.  Patented June 20, 1922.

Application filed February 27, 1922. Serial No. 539,642.

*To all whom it may concern:*

Be it known that I, CHARLES A. MINER, a citizen of the United States, residing at the city and county of Kalamazoo, State of Michigan, have invented certain new and useful Improvements in Door and Wall Panels for Vehicle Bodies, of which the following is a specification.

This invention relates to improvements in door and wall panels for vehicle bodies.

The main objects of the invention are:

First, to provide an improved panel for vehicle bodies in which the glass is effectively supported and the frame may be quite narrow.

Second, to provide an improved panel for vehicles which is very strong and rigid and at the same time is comparatively light.

Third, to provide an improved panel having these advantages which is simple and economical in its parts, the parts being very easily assembled and may be disassembled should occasion require to renew the window pane.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a side perspective view of a vehicle body embodying the features of my invention, the body being shown mainly in conventional form and the front portion thereof partially broken away.

Fig. II is an enlarged detail horizontal section on a line corresponding to line 2—2 of Fig. I.

Fig. III is an inside elevation of the outer panel member.

Fig. IV is an inside view of the inner frame member, one corner of the frame member being broken away.

Fig. V is a detail vertical section on a line corresponding to line 5—5 of Fig. VI, the coupling rod being shown in full lines.

Fig. VI is a fragmentary front elevation of the rear door panel, parts being broken away to show structural details.

Fig. VII is a fragmentary front elevation of the front door panel.

In the drawings, similar reference numerals refer to similar parts throughout the several views, and the sectional views are taken looking in the direction of the little arrows at the ends of the section lines.

Referring to the drawings, the body is designated generally by the numeral 1 and is provided with a rear door 2 and front door 3. These parts are shown conventionally as the body and doors may be modified as desired.

The top 4 is a fixed top, that is, in the structure illustrated it is built in as a part of the body. The structure illustrated has removable door panels 5 and 6, the same being detachably mounted on the doors by means of dowels or supporting arms 7 projecting below the lower edges of the panels to be engaged with suitable sockets in the upper edge of the door. As these sockets and the clamping means for the supporting dowels form no part of this invention they are not illustrated herein. These door panels are substantially duplicates so far as structure is concerned.

8 represents the window panes or glass panels. These are supported by the frame comprising the outer frame member 9 and inner frame member 10, preferably formed as sheet metal stampings for economy in manufacture and also because a spring clamping action is secured for the panels or window panes 8. These frame members have inturned opposing flanges 11 at their inner edges which clamp the pane 8 adjacent the edges thereof as shown in Fig. II. The inner frame member 10 has inturned flanges 12 at its outer edge disposed in a spaced relation to the outer edges of the outer frame member and normally closing the space between the frame members as well as forming a rabbet-like edge for the panel.

The panel members are provided with suitable coverings 13 of cloth or leather, the coverings being disposed with their edges folded inwardly over the edges of the frame members so that when the frame members are assembled the edges of the coverings are enclosed thereby. Each frame member is provided with inwardly projecting eyes 14 disposed so that when the frame members are in assembled relation there are a series of aligned eyes at the top, bottom and sides of the frame.

The coupling rods 15 are arranged through the aligned eyes at the top and bottom of the frame members, while the coupling rods 16 are arranged through the eyes at the sides of the frame, the lower ends of the rod 16 being extended to provide the supporting dowels 7. These coupling rods lock the members together and in clamping engagement with the window pane. A gasket 17 is preferably provided for the edges of the window pane to exclude moisture and also to provide a more perfect clamping action; also the front side rod 16 for the front door is bent slightly to accommodate the inclined edge of the front door. The eye 18 is somewhat elongated to permit the easy insertion and withdrawal of this rod.

With the parts thus formed and arranged they are very simple and economical to produce and to assemble and, should occasion require, the parts may be easily disassembled and re-assembled for the renewal of the pane. The glass is supported so that it does not rattle and so that there is practically no racking strain thereon such as would be likely to cause it to crack the same. A further advantage is that the frame members may be made comparatively narrow and at the same time are of sufficient strength to effectively support the glass panels even when formed of plate glass as is usually the case.

I have illustrated and described my improvements in an embodiment which I find very satisfactory. I have not attempted to illustrate or describe the various adaptations to different types of bodies as I believe such adaptations will be readily understood by those skilled in the art to which my invention relates.

Having thus described my invention, what I claim as new and desire to secure by Letters Patent, is:

1. The combination of a window pane, outer and inner frame members having opposed inturned flanges clamping the edges of the pane adjacent its edges, the outer edges of the inner frame member having inturned flanges disposed in a spaced relation to the outer edges of the outer frame member and normally closing the space between the frame members, said frame members being formed of sheet metal stampings and provided with coverings folded inwardly over their inner and outer edges, each frame member being provided with a series of inwardly projecting eyes disposed at the top, bottom and sides thereof, the corresponding series of eyes of the frame members being aligned when the frame members are in assembled relation, and coupling rods disposed through the aligned series of eyes of said frame members, the lower ends of the side coupling rods being extended to provide supporting arms.

2. The combination of a window pane, outer and inner frame members having opposed inturned flanges clamping the edges of the pane adjacent its edges, the outer edges of the inner frame member having inturned flanges disposed in a spaced relation to the outer edges of the outer frame member and normally closing the space between the frame members, of inwardly projecting eyes disposed at the top, bottom and sides thereof, the corresponding series of eyes of the frame members being aligned when the frame members are in assembled relation, and coupling rods disposed through the aligned series of eyes of said frame members, the lower ends of the side coupling rods being extended to provide supporting arms.

3. The combination of a window pane, outer and inner frame members having opposed inturned flanges clamping the edges of the pane adjacent its edges, the outer edges of the inner frame member having inturned flanges disposed in a spaced relation to the outer edges of the outer frame member and normally closing the space between the frame members, said frame members being formed of sheet metal stampings and provided with coverings folded inwardly over their inner and outer edges, each frame member being provided with a series of inwardly projecting eyes disposed at the top, bottom and sides thereof, the corresponding series of eyes of the frame members being aligned when the frame members are in assembled relation, and coupling rods disposed through the aligned series of eyes of said frame members.

4. The combination of a window pane, outer and inner frame members having opposed inturned flanges clamping the edges of the pane adjacent its edges, the outer edges of the inner frame member having inturned flanges disposed in a spaced relation to the outer edges of the outer frame member and normally closing the space between the frame members, of inwardly projecting eyes disposed at the top, bottom and sides thereof, the corresponding series of eyes of the frame members being aligned when the frame members are in assembled relation, and coupling rods disposed through the aligned series of eyes of said frame members.

5. The combination of a window pane, outer and inner frame members formed of sheet metal stampings and having opposed inturned flanges clamping the edges of the pane adjacent its edges, the inner frame member having inturned flanges at its outer edge closing the space between the frame members, each frame member being provided with eyes on its inner sides disposed so that when the members are assembled a plurality of eyes are brought into alignment at the top, bottom and sides of the frame members, and coupling rods disposed through the aligned eyes of said frame members.

6. The combination of a window pane, outer and inner frame members formed of sheet metal stampings and having opposed inturned flanges clamping the edges of the pane adjacent its edges, the inner frame member having inturned flanges at its outer edge closing the space between the frame members, each frame member being provided with eyes on its inner sides disposed so that when the members are assembled a plurality of eyes are brought into alignment, and coupling rods disposed through the aligned eyes of said frame members.

7. The combination of a panel, frame members disposed with their inner edges clamping the edges of the panel, each frame member being provided with a series of inwardly projecting eyes disposed at the top, bottom and sides thereof, the corresponding series of eyes of the frame members being aligned when the frame members are in assembled relation, and coupling rods disposed through the aligned series of eyes of said frame members, the lower ends of the side coupling rods being extended to provide supporting arms.

8. The combination of a panel, frame members disposed with their inner edges clamping the edges of the panel, each frame member being provided with a series of inwardly projecting eyes disposed at the top, bottom and sides thereof, the corresponding series of eyes of the frame members being aligned when the frame members are in assembled relation, and coupling rods disposed through aligned series of eyes of said frame members.

9. The combination of a panel, a pair of supporting frame members each provided with eyes on its inner side disposed so that when the members are in assembled relation a plurality of the eyes are brought into alignment at the top, bottom and sides of the frame, and coupling rods disposed through the aligned eyes and supporting the frame members in clamping engagement with the panel.

10. The combination of a panel, frame members disposed with their inner edges engaging the edges of the panel, each member being provided with eyes on its inner side disposed so that a plurality of eyes are brought into alignment when the frame members are in assembled relation, and coupling rods disposed through the aligned eyes.

In witness whereof, I have hereunto set my hand and seal.

CHARLES A. MINER. [L. S.]